W. SEYMOUR.
PRESSURE INDICATOR.
APPLICATION FILED OCT. 26, 1909.

1,037,550.

Patented Sept. 3, 1912.

Witnesses

Inventor
WILLIAM SEYMOUR
BY Luther V. Moulton
Attorney

UNITED STATES PATENT OFFICE.

WILLIAM SEYMOUR, OF GRAND RAPIDS, MICHIGAN.

PRESSURE-INDICATOR.

1,037,550.

Specification of Letters Patent.  Patented Sept. 3, 1912.

Application filed October 26, 1909. Serial No. 524,722.

*To all whom it may concern:*

Be it known that I, WILLIAM SEYMOUR, a citizen of the United States of America, residing at Grand Rapids, in the county of Kent and State of Michigan, have invented certain new and useful Improvements in Pressure-Indicators; and I do hereby declare the following to be a full, clear, and exact description of the invention, such as will enable others skilled in the art to which it appertains to make and use the same.

Figure 1:
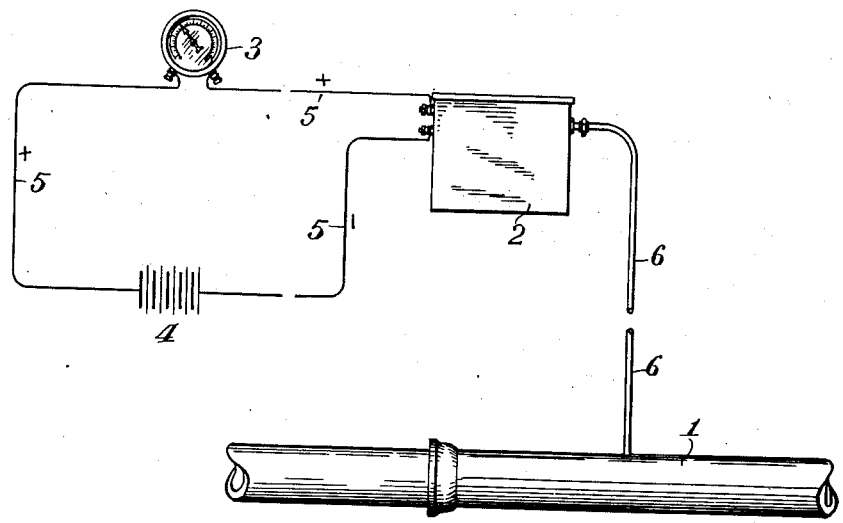
Figure 2:
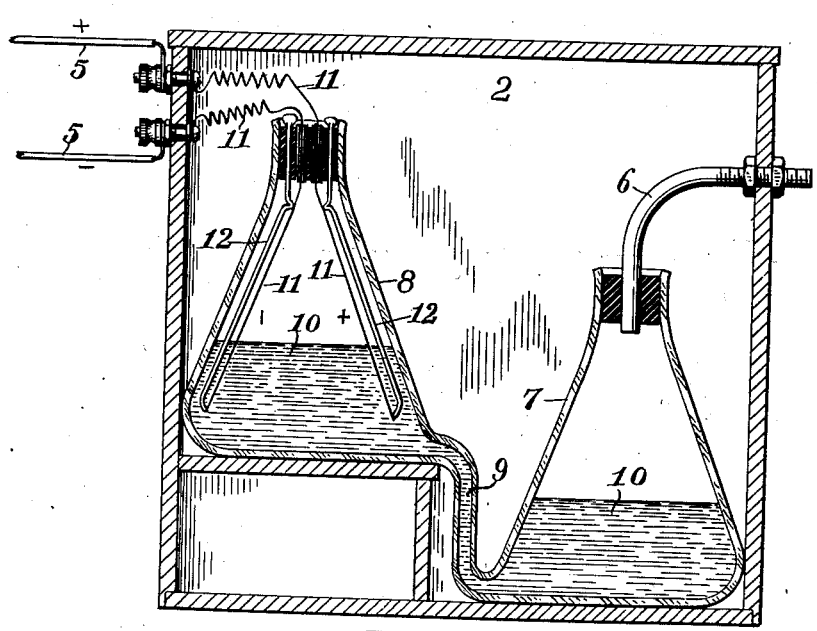

My invention relates to improvements in pressure indicators and more particularly to devices for indicating the pressure in gas mains; and its object is to provide a device that will correctly indicate the pressure in a gas main or other analogous device at some distant point by means of an index upon a dial; and it consists essentially of a battery and volt meter conveniently located, an electrical circuit extending from the volt meter and battery to some distant point near where the main is located, the pressure in which is to be indicated, a variable electrical resistance in the circuit and means for varying the resistance, operated by the varying pressure in the main, and in various features of combination and arrangement as will more fully appear by reference to the accompanying drawings, in which:

Figure 1 is a diagrammatic representation of a device embodying my invention; and, Fig. 2 a vertical section of a portion of the device, together with the inclosing case shown on an enlarged scale.

Like numbers refer to like parts in both of the figures.

1 represents a portion of a gas main or other device containing a fluid under pressure; 2 a case to contain the variable resistance apparatus; 3 a volt meter located at any distant and convenient point for observation where it is desired to indicate the pressure in the main 1; 4 a battery or other source of constant electrical energy; 5 an electrical circuit connecting the battery and volt meter in series with the variable resistance apparatus in the case 2, hereafter described.

6 is a pipe or conduit communicating with the main 1 at one end and extending within the case 2 and communicating with a closed vessel 7 within the case. 8 is another vessel within the case, preferably elevated above the level of the vessel 7, and communicating therewith at the bottom of each by a conduit 9. These two vessels are preferably of glass or other like material and integrally connected by an integral conduit 9. The vessel 8 is preferably of truncated conical form to conform to the diverging form of the contained conductors 11 which are preferably platinum wires supported upon diverging arms 12 near the opposite sides of the vessel 8. These arms are preferably of glass or other insulating material and the wires arranged in the same plane and diverging downward from each other terminate apart near the bottom of the vessel and are extended upward through the closure of the vessel, and thence connected to the respective positive and negative conductors of the circuit 5. They thus constitute diverging terminals inclosed within the vessel 8. These wires are preferably extended through tubes in the closure which tubes are large enough to form vents to permit the flow of air therethrough to avoid air pressure from modifying the action of the device. However for high pressures these tubes may be sealed, in which case the inclosed air would operate as a spring to change the reading to higher pressures.

10 represents any convenient fluid having the desired electrical resistance to properly modify the voltage of the current as hereafter explained. I prefer to use in this device a dilute solution of sulfuric acid in distilled water, but do not limit myself in this respect, any fluid having resistance to electric currents may be used.

The volt meter 3 is preferably provided with a modified scale over which the index traverses to indicate pressures in inches of water in the main, this scale being calibrated relative to the rise and fall of the voltage of the current passing through the meter as will easily be understood without further explanation.

In operation the pressure in the vessel 7 rises and falls in common with that in the main 1. This pressure as it increases forces more of the fluid 10 out of the vessel 7 into the vessel 8, which tends by gravity to return to the vessel 7. As the fluid rises in the vessel 8, the resistance decreases by virtue of the decrease in the gap between the wires at the surface of the fluid and also to an increased submergence of the wires 11 therein. The voltage of the current will thus increase in proportion to the diminution of resistance in this gap. This will, of course, operate to move the index of the volt meter over the scale, which being properly calibrated will accurately indicate the changes in pressure in the main 1 upon the scale of the meter 3.

What I claim is:—

In a pressure indicator, an electric circuit including a volt-meter calibrated to indicate pressures, a conical vessel, diverging wires within the said vessel forming terminals to the said circuit and spaced apart, insulated supports for said wires, a second vessel, a channel of communication between the lower end of said vessels, and a pipe communicating with the upper end of the last named vessel and with the member which contains the fluid under the pressure to be indicated.

In testimony whereof I affix my signature in presence of two witnesses.

WILLIAM SEYMOUR.

Witnesses:
 GEORGIANA CHACE,
 LUTHER V. MOULTON.